No. 798,218. PATENTED AUG. 29, 1905.
W. H. SCOTTON.
SPEED CHANGING GEAR.
APPLICATION FILED OCT. 1, 1904.
2 SHEETS—SHEET 1.
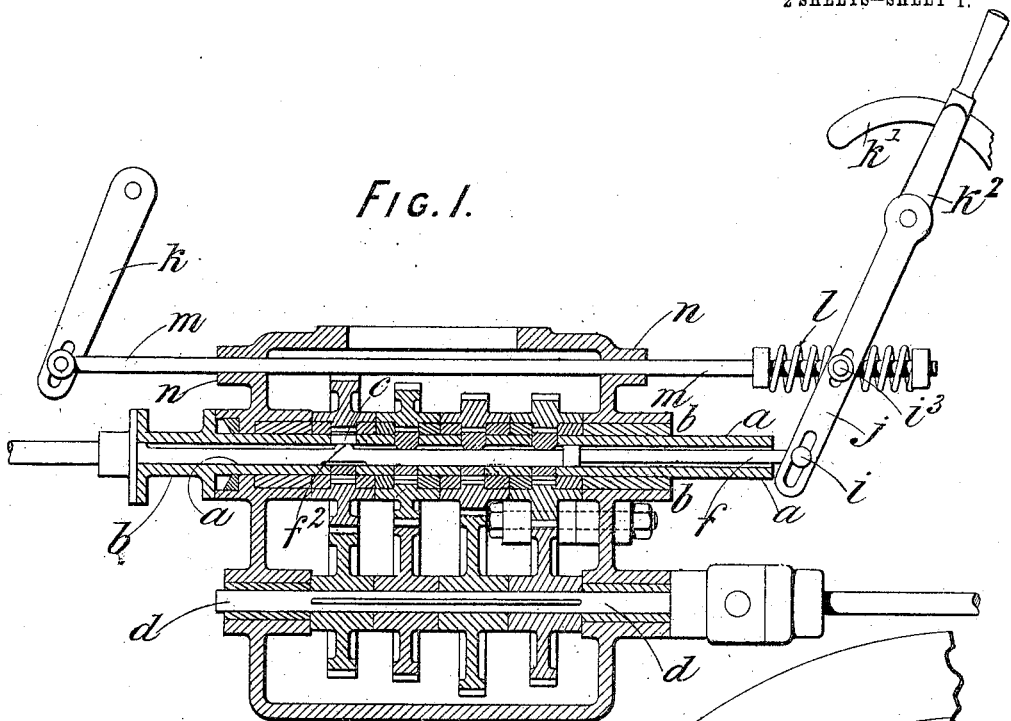
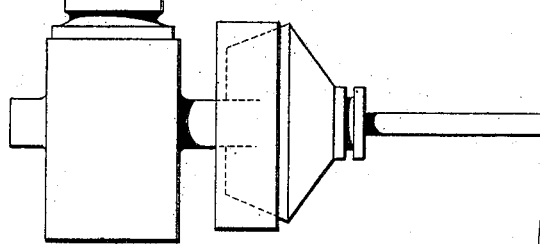
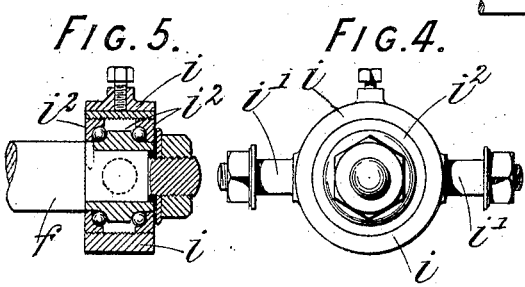
Witnesses.
Wm Munn Andrew
Henry J. Brockwell.
Inventor
William Henry Scotton,
by Fairfax & Wetter
Attorneys.

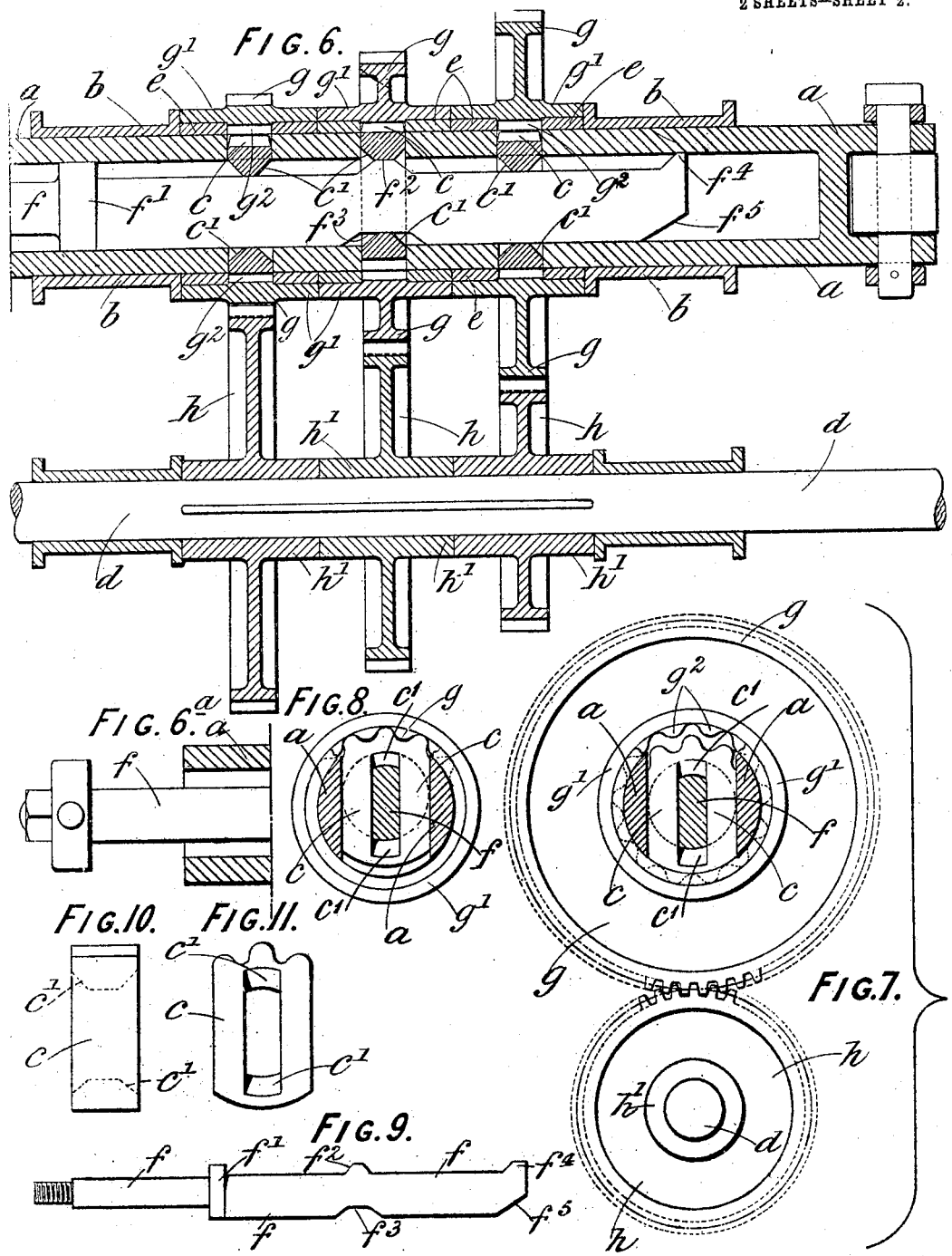

UNITED STATES PATENT OFFICE.

WILLIAM HENRY SCOTTON, OF IPSWICH, ENGLAND, ASSIGNOR OF ONE-HALF TO ARTHUR HACKBLOCK, OF FERN BEECH, EPSOM, ENGLAND.

SPEED-CHANGING GEAR.

No. 798,218. Specification of Letters Patent. Patented Aug. 29, 1905.

Application filed October 1, 1904. Serial No. 226,846.

*To all whom it may concern:*

Be it known that I, WILLIAM HENRY SCOTTON, a subject of the King of the British Dominions, residing at Ipswich, in the county of Suffolk, England, (whose post-office address is 69 All Saints' road, Ipswich,) have invented certain new and useful Improvements in Speed-Changing Gear, of which the following is a specification.

This invention relates to improvements in the mechanism used for changing the speed of a driven shaft or machine in any predestined proportion or ratio of speed of the motor or driving-shaft, either while in motion or at rest.

In the further description of this invention reference is made to the accompanying drawings, in which—

Figure 1 is a sectional elevation of a gear-box as arranged for a motor-car. Fig. 2 is an outline elevation of a motor-engine and clutch for driving the same with the actuating-shaft broken off. Fig. 3 is an outline elevation of one of its wheels and bevel-gear, the transmitting-shaft being also broken off. Fig. 4 is an elevation, and Fig. 5 is a section, of a cross-head with ball-bearings. Fig. 6 is a sectional elevation of the two shafts and communicating gearing somewhat similar to Fig. 1, but removed from the gear-box. Fig. 6$^a$ is a sectional detail. Fig. 7 is an end elevation of the same, partly in section. Fig. 8 is another view of the sectional part shown in Fig. 7, but with a driver or locking-piece in position. Fig. 9 is a longitudinal elevation of a sliding bar for changing the speed, and Figs. 10 and 11 are elevations at right angles to each other of the said driver or locking-piece.

The invention mainly consists of a hollow shaft $a$, journaled in suitable bearings at $b$ and having four toothed wheels in Fig. 1 and three in Fig. 6, loosely mounted on the hollow shaft $a$, so that they can revolve freely thereon. A sliding driver or locking-piece $c$ of special construction, movable within a slot cut through the hollow shaft $a$, beneath each wheel mounted thereon, is adapted to lock each of the said toothed wheels to the shaft according to the will and action of the operator in sliding the said key into position to lock the desired wheel by means of a sliding bar. Another but solid shaft $d$, also mounted in suitable bearings, is combined with the above and arranged parallel with the hollow shaft $a$. The wheels on the hollow shaft vary in diameter and are mounted loosely until locked and kept from moving sidewise by sleeves, collars, distance-pieces $e$, or the like, so as to be exactly opposite wheels of a corresponding diameter, which are keyed to the solid shaft. Each pair of wheels, therefore, is adapted to give a certain ratio of speed reduction according to the number of teeth in the respective wheels, and as each pair varies in this respect the number of speed changes obtainable varies with the number of pairs engaged.

The hollow shaft is bored to receive a sliding bar $f$, having a collar $f'$ near the end, by which it is actuated, the said collar being slightly smaller than the bore of the shaft to enable it to slide within freely as far as may be required. From the collar to the other end the sliding bar is flattened and portions cut away at obtuse angles, so that at about the center a short parallel piece $f^2$ of the bar is left projecting at the full diameter of and in line with the surface of the collar, beveled obtusely down on each side to the cut-away portions of the bar, while a corresponding recess $f^3$ is cut away from the opposite or full line of the bar; but the recess is rather wider and with more obtuse angles than the projecting piece. At the extreme end of the flattened part of the bar a similar parallel projection $f^4$ is left standing, but beveled on one side only, and a wide and flatter bevel $f^5$ made at the opposite edge to approximately correspond to the projection; but in some cases this may be modified.

Each wheel $g$ on the hollow shaft $a$ is formed or combined with a bored flange $g'$ and has internal teeth $g^2$ formed within the bore of its hub, the teeth being preferably of the rounded type, top and bottom. A slot is cut through the hollow shaft where each wheel $g$ is mounted, and a sliding key $c$, acting as a driver, is fitted to slide up and down in each of these slots, having on one edge a few teeth similarly formed to the internal teeth and adapted to engage with them. This sliding driver $c$ is shown separately in the two elevations, Figs. 10 and 11. An oblong slot with beveled edges $c'$ at the top and bottom is also formed in each sliding driver, and the driver is adapted to freely slide on the flattened part of the sliding bar $f$, so that when confined in place within its slot in the hollow shaft and the sliding bar pushed in and out the projecting portion $f^2$ of the sliding bar coming in contact with its beveled edges $c'$ forces the sliding driver $c$ up through its slot on one side of the hollow shaft, causing the few teeth of that particular driver to engage with the internal teeth $g^2$ of the corresponding wheel, as shown in Figs. 1, 6, and 8, and therefore locking it to the shaft to partake of its circular motion.

In pushing the sliding bar $f$ into position to lock a particular wheel to the hollow shaft $a$ and forcing its special driver $c$ up to engage with its wheel $g$ by means of the short parallel piece $f^2$ left projecting on that edge of the bar, as just described, the remaining cut-away portion or portions, together with the full diameter of its opposite edge, are adapted to withdraw any other driver $c$ that may have been locked by its teeth to its corresponding wheel, so that the latter becomes free. Therefore however many pairs of wheels may be intermeshed only one pair can be so connected at one time as to fully transmit all the driving power, the others being out of engagement through their respective driving-keys $c$ being depressed on the side of the cut-away part of the bar $f$; but the above-mentioned and projecting piece may also be used to force the end driver into engagement with its wheel, thus shortening the travel of the sliding bar; otherwise one projection situated about the center of the length of the flattened part is sufficient for that purpose; but if the said projecting parts are used they must be so spaced with relation to the portion of the wheels on the hollow shaft that only one of the latter can be locked to its shaft at a time, all other wheels that may be employed being loose or free to turn on the hollow shaft. The end projecting piece is also adapted as a guide within the hollow shaft at one end and the collar above-mentioned as another.

The wheels $h$ on the solid shaft $d$ may be fitted on a squared portion or keyed or otherwise attached so as to turn with the shaft, and they are respectively arranged in line to intermesh with each corresponding wheel $g$ by wide hubs $g'$ and $h'$ or otherwise. It is to be understood that either the solid shaft $d$ or the hollow shaft $a$ may be the driving-shaft, the other being the driven one at the speed proportioned by the particular pair of wheels in which the driving-key $c$ with its teeth is forced into the locking position with the internal teeth $g^2$ by the projection $f^2$.

A convenient way to move the sliding bar within the hollow shaft is to mount a cross-head $i$, Figs. 4 and 5, having two trunnions or pintles $i'$ on a ball-race bearing $i^2$, secured at one end of the sliding bar $f$, so that while the latter revolves freely the cross-head $i$ is kept free from revolution and relatively stationary; but the trunnions or pintles are fitted into slots in the end of a double arm or lever $j$, which may be directly actuated by the operator through a lever $k$ or through the intervention of a screw or gearing, with means, such as a quadrant $k'$ or equivalent means, as desired, to indicate to the driver of a motor-car (for instance) the position into which the lever $j$ must be moved to connect a desired pair of wheels to give the particular speed required. This part of the mechanism is modified to suit special applications of the invention, and suitable connections, such as the rod $m$, working in guides of the gear-box $n$, are provided for communicating the motion for such applications, varied also to suit the conditions of using the hollow shaft either as the driving or the driven shaft. Suitable springs $l$ may also be combined with the sliding bar or shifting gear $m$ and with another cross-head $i^3$ in arresting the sliding bar at a required position in relation to each loose wheel or to one particular one. The invention is applicable to the change-speed gear of machine-tools, as well as to that of motor-cars or the like purpose.

What I claim, and desire to secure by United States Patent, is—

In speed-changing gearing the combination of a hollow shaft having a plurality of slots therein, with a toothed wheel having an extended hub and internal teeth in its bore mounted revolubly on said shaft at each of said slots; a key-driver having projecting teeth on one part of its peripheral surface, plain circular surface on the opposite peripheral surface, parallel sides, and a central oblong slot; a bar, flat at a portion of its length, having a projecting part and corresponding recess on opposite edges, adapted to slide within said key-driver slot and said hollow shaft to force said driver-teeth into or out of contact with said internal teeth; a hand-lever and cross-head connection for sliding said bar within said hollow shaft; and a parallel revoluble shaft having wheels thereon intermeshing with and adapted for transmitting motion to or from said wheels on said hollow shaft, substantially as and for the purpose specified.

In testimony whereof I have signed this specification in the presence of two subscribing witnesses.

WILLIAM HENRY SCOTTON.

Witnesses:
ARTHUR HACKBLOCK,
HENRY J. BROCKWELL.